United States Patent [19]

McDaniel

[11] Patent Number: 4,499,264

[45] Date of Patent: Feb. 12, 1985

[54] PREPARATION OF AMINO POLYOLS

[75] Inventor: Kenneth G. McDaniel, Round Rock, Tex.

[73] Assignee: Texaco Inc., White Plains, N.Y.

[21] Appl. No.: 507,815

[22] Filed: Jun. 27, 1983

[51] Int. Cl.$^3$ .............................................. C08G 59/64
[52] U.S. Cl. .................................... 536/50; 527/300; 527/312; 536/55; 536/55.2; 536/111; 536/120; 544/401; 564/367; 564/388; 564/389; 564/475; 564/505
[58] Field of Search .................. 536/50, 55, 55.2, 111, 536/120; 527/300, 312; 544/401; 564/367, 388, 389, 390, 475, 505

[56] References Cited

U.S. PATENT DOCUMENTS 3,297,597 1/1967 Edwards et al. .................... 521/166

*Primary Examiner*—Maurice J. Welsh
*Attorney, Agent, or Firm*—Jack H. Park; Kenneth R. Priem; Richard A. Morgan

[57] ABSTRACT

An improved method is disclosed for producing amino polyols useful in preparing polyurethane foams. The improvement concerns charging ammonia, a primary amine or a secondary amine to the reaction vessel at the end of the oxide digestion step. The amine or ammonia scavenges the residual oxide and the resulting alkanol amine becomes one of the components of the polyol mixture. Alkanol amines are beneficial components of urethane polyols.

In prior art industrial practice, residual oxide is vented to a scrubber system and then stripped to a low concentration.

17 Claims, No Drawings

4,499,264

PREPARATION OF AMINO POLYOLS

FIELD OF THE INVENTION

This invention is an improved process for producing amino polyols. In particular, the present invention is an improved process for making polyols which are used in preparing polyurethane foams. The process is an improvement over the prior art in both process energy consumption and yield from reactants.

BACKGROUND OF THE INVENTION

The use of polyols in the preparation of polyurethanes by reaction of a polyol with a polyisocyanate in the presence of a catalyst and perhaps other ingredients is well known. Conventional polyols for polyurethane foams are usually made by the reaction of a polyhydric alcohol with an alkylene oxide to a molecular weight of about 2000 to about 3000 or more. These polyols are then reacted with polyisocyanate in the presence of water or other blowing agents such as the fluorocarbons to produce polyurethane foam.

Many different polyol initiators are known in the art. Polyol initiators which form linear or slightly branched polymers are molded to produce flexible urethane foams. Polyol initiators which form more highly branched polymers are used to produce rigid foams.

The alkoxylation in the preparation of any amino polyol is equilibrium limited. The method used to remove unreacted alkylene oxide in present industrial practice is to strip off residual alkylene oxide, leaving the alkoxylated amino polyol.

Kirk-Othmer, *Encyclopedia of Chemical Technology*, Second Edition, Vol. 16, page 598 and Stanford Research Institute, Report No. 45, *Polyols from Ethylene Oxide and Propylene Oxide*, both discuss generally the reaction of ammonia and amines with propylene oxide and ethylene oxide to form alkanol amines.

U.S. Pat. No. 3,297,597 (Edwards et al) describes the reaction of an alkylene oxide with the Mannich condensation product of a phenolic compound with formaldehyde and an alkanolamine.

SUMMARY OF THE INVENTION

The invention concerns a method for preparing amino polyols which are useful in preparing polyurethane foams. These polyols are prepared by reacting and digesting an amino polyhydric initiator with one or more alkylene oxide groups to form a crude polyol mixture comprising an alkoxylated amino polyol with hydroxyl number 300 to 900 and residual alkylene oxide. Residual alkylene oxide is reacted with a second amine in situ to form an alkanol amine. The alkanol amines thereby formed impart beneficial properties to polyurethane foams and are therefore not separated from the amino polyol. The amino polyol and alkanol amine are used together in a polyurethane foam process.

DESCRIPTION OF THE PREFERRED EMBODIMENTS

The present invention is an improved process for preparing an amino polyol for use in preparing polyurethane foams.

In a process for preparing an amino polyol which comprises:
(a) mixing an amino polyhydric initiator with an alkylene oxide selected from the group consisting of ethylene oxide, propylene oxide, 1,2-butylene oxide, styrene oxide, glycidol and mixtures thereof;
(b) reacting and digesting the initiator with the alkylene oxide at a temperature of 30° C. to 180° C. to form a crude polyol mixture comprising an alkoxylated amino polyol with hydroxyl number of 300 to 900 and residual alkylene oxide;

wherein the improvement comprises:
(c) reacting the residual alkylene oxide with a second amine in situ at a temperature of 30° C. to 180° C. to form an alkanol amine.

Selection of the amino polyhydric initiator is not critical and any of the amino polyols particularly amino polyols which initiate highly branched polymers upon alkoxylation will do. These amino polyol initiators have an active hydrogen functionality equal to or greater than three and preferably about four to about eight. Rigid amino polyol initiators have a hydroxyl number of typically 300 to 900 and preferably 300 to 800.

Polyhydric initiators which contain no nitrogen may be mixed with a first amine to make them amino polyhydric initiators. Suitable polyhydric initiators have an active hydrogen functionality equal to or greater than 3. As with the rigid amino polyol initiators, they have a preferable functionality of about four to about eight and a hydroxyl number of typically 300 to 900 and preferably 300 to 800. The terms polyhydric initiator and amino polyhydric initiator are used interchangeably herein and in the art.

The most common rigid polyhydric initiators are carbohydrates, aromatic resins, amines and aromatic amines. Typical carbohydrate initiators are sucrose, sorbitol, methyl glucoside and starch glucosides. Examples of aromatic amines and aromatic resins useful in the present invention are Mannich condensates of phenolic compounds, aniline-formaldehyde condensates, phenol formaldehyde condensates and mixed condensates of phenol-amines and formaldehyde. These rigid polyol initiators are illustrative and not limitative.

If the polyhydric initiator contains no nitrogen, it is first mixed with a first amine. The first amine used in the present invention may be any of a number of amines used in the art for preparing amino polyols. Most preferable is the selection of an alkanol amine, for general compatibility in the reaction sequence. Examples of alkanol amines used for this purpose are monoethanol amine, diethanol amine, triethanolamine, hydroxyethyl-aminoethyl ether, isopropanol amine, diisopropanol amine and triisopropanol amine.

Examples of other amines useful in the present invention for the first amine are ammonia, methylamine, ethylenediamine, 1,3-propanediamine, diethylenetriamine, triethylenetetramine, hexaethyleneheptamine, iminobis-propylamine, aminoethylethanolamine, aniline, benzylamine, piperazine, toluene diamine and aniline. These amines are illustrative and not limitative.

The amino polyhydric initiator is reacted at typical alkoxylation conditions with an alkylene oxide. Suitable alkylene oxides are ethylene oxide, propylene oxide, 1,2- butylene oxide, styrene oxide, glycidol and mixtures thereof. The resulting alkoxylated amino polyol will preferably have a hydroxyl number of 250 to 900 preferably 350 to 800. Molecular weights are typically 200 to 4000, preferably 2000 to 3000. The alkylene oxide is preferably propylene oxide or a mixture of propylene oxide and ethylene oxide.

The alkoxylation is an equilibrium controlled reaction. At typical reaction conditions of 30° C. to 180° C.

unreacted alkylene oxide remains mixed with alkoxylated amino polyol. By the present best industrial practice residual alkylene oxide is vented to a scrubber system and finally stripped to a low concentration, leaving the alkoxylated amino polyol alkoxylated first amine product. The scrubbed alkylene oxide is then treated to make it safe for disposal.

An improvement has been found in the process for producing amino polyols which is surprising for its simplicity and synergistic in its immediate adaptability to present industrial practice. The improvement is energy efficient, produces a better product for making urethane foams and produces a better yield based on raw materials. The improvement comprises:

reacting the unreacted alkylene oxide with a second amine at a temperature of 30° C. to 180° C. to form an alkanol amine.

The second amine may be ammonia, a primary or secondary amine. The second amine is preferably selected from the group consisting of ammonia, monoethanol amine and diethanol amine. It may be selected from the group consisting of methylamine, ethylenediamine, 1,3-propanediamine, diethylenetriamine, triethylenetetramine, hexaethyleneheptamine, imino-bispropylamine, isopropanolamine, diisopropanolamine, aminoethylethanolamine, aniline, benzylamine, piperazine, toluene diamine and aniline.

In the practice of this invention, the second amine, preferably ammonia or a primary or a secondary amine is charged to the reactor at the end of the normal alkylene oxide digestion step and the amine or ammonia scavenges the residual alkylene oxide and the resulting alkanol amine becomes one of the components of the polyol mixture. Alkanol amines are beneficial components of urethane polyols particularly rigid urethanes, and therefore produce a higher quality product.

The invention reduces production costs by lowering raw material loss, by reducing the energy cost of stripping polyol product and by reducing the associated environmental cost for scrubbing and for disposal or reclamation of the resulting material.

The present invention is equally adaptable to methods for preparing polyols for use in rigid polyurethane foams by Mannich condensation. Mannich condensation polyols are more fully discussed in U.S. Pat. No. 3,297,597; which is incorporated herein in its entirety by reference.

In another embodiment the present invention is:

in a process for preparing a modified amino polyol for use in preparing rigid polyurethane foams which comprises:
(a) mixing a phenol, a first alkanol amine, and formaldehyde
(b) heating the resulting mixture at a temperature of from 50° C. to 150° C. for a period of time sufficient to reduce the formaldehyde contact to no more than about 1%;
(c) stripping water from the reaction product; and
(d) adding at a temperature of 30° C. to 180° C. an alkylene oxide selected from the group consisting of ethylene oxide, propylene oxide, 1,2-butylene oxide, styrene oxide, glycidol and mixtures thereof to the stripped reaction product at a temperature of 30° C. to 180° C. to form a crude polyol mixture comprising an alkoxylated amino polyol with a hydroxyl number of 300 to 900, and preferably 300 to 800 and residual alkylene oxide;
wherein the improvement comprises:
reacting the alkylene oxide in situ with a second amine at a temperature of 30° C. to 180° C. to form a second alkanol amine.

The polyol that is employed in accordance with the present invention is obtained by the addition at a temperature of about 30° to about 180° C. of an alkylene oxide to a Mannich condensation product of a phenolic compound with formaldehyde and an alkanol amine. These polyols have hydroxyl numbers of from about 300 to about 900 and a nitrogen content of from about 1 to about 15 wt. percent.

The Mannich reaction is a well-known reaction wherein an active hydrogen compound is reacted with formaldehyde and a primary or secondary amine to provide a substituted aminomethyl derivative of the active hydrogen starting material. The Mannich derivative to be employed as a starting material for the preparation of the polyols of the present invention is prepared in accordance with the customary procedure using a phenolic compound, as described hereinbelow, as the active hydrogen compound. The ortho and para positions of these phenolic compounds are sufficiently reactive to enter into the Mannich reaction.

For example, the Mannich reaction may be conducted by premixing the phenolic compound with a desired amount of the alkanolamine and then slowly adding formaldehyde to the mixture. At the end of the formaldehyde addition, the reaction mixture is slowly heated with agitation to a temperature of a least about 50° C., such as a temperature within the range of about 80° C. to about 150° C. for a period of time sufficient to reduce the formaldehyde content to at least about 1 wt. percent. This will require normally from about two to about four hours reaction time at the elevated temperature.

At the end of the reaction, water is stripped from the reaction mixture to provide thereby a crude Mannich reaction product. Although it is within the scope of the present invention to separate the crude reaction product by conventional means into specific components or fractions, it is a feature of the present invention that the entire crude Mannich reaction product may be used as such without attempting to isolate the individual components thereof. In fact, in accordance with the preferred embodiment of the present invention, the entire crude Mannich reaction product is used as such, and when this is done positive steps should be taken in order to provide the reaction product containing less than about 1 wt. percent of free formaldehyde.

The phenolic compound to be employed in the Mannich condensation is an aromatic compound containing one or more hydroxyl groups attached directly to the aromatic nucleus and having a hydrogen atom on one or more of the ring positions ortho and para to the hydroxyl group and which is otherwise unsubstituted or substituted with substituent groups which are non-reactive under Mannich reaction conditions. Substituent groups that may be present include alkyl, cycloalkyl, aryl, halo, nitro, carboalkoxy, haloalkyl and hydroxyalkyl. The phenolic compound is further characterized by a molecular weight within the range of from about 94 to about 500. Examples of acceptable phenolic compounds include o-,m-, of p-cresols, ethylphenol, nonylphenol, p-phenylphenol, 2,2-bis(4-hydroxyphenyl) propane, Beta-naphthol, Beta-hydroxy-anthracene, p-chlorophenol, o-bromophenol, 2,6-dichlorophenol, p-nitrophenol, 4-nitro-6-phenylphenol, 2-nitro-4-methylphenol, 3,5-dimethylphenol, p-isopropylphenol, 2- bromo-4-cyclohexylphenol, 2-methyl-4-bromphenol, 2-(2-hydroxypropyl)phenol, 2-(4-hydroxphenyl) ethanol, 2-carbethoxyphenol and 4-chloromethylphenol.

The alkanolamine to be reacted with the phenolic compound and formaldehyde in accordance with the present invention is an alkanol amine as previously defined.

Examples of other suitable alkanol amines are alkanol amines having the formula:

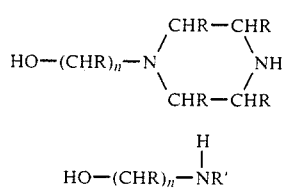

$$HO-(CHR)_n-NR'H$$

wherein R is selected from the group consisting of hydrogen and $C_1$-$C_4$ alkyl, R' is selected from the group consisting of hydrogen, $C_1$-$C_4$ alkyl and —(CHR)$_n$—OH, and n is a positive integer having a value of two to five.

Examples of suitable alkanol amines that may be used are monoethanolamine, diethanolamine, isopropanolamine, bis(2-hydroxypropyl)amine, hydroxyethylmethylamine, N-hydroxyethylpiperazine, N-hydroxybutylamine, N-hydroxyethyl-2,5-dimethylpiperazine, etc.

Formaldehyde may be employed in the Mannich reaction in any of its conventional forms, such as an aqueous formalin solution, an "inhibited" methanol solution, paraformaldehyde or trioxane.

The characteristics of the Mannich product and consequently the characteristics of the alkylene oxide adduct of the Mannich product may be varied over wide limits by proper choice of the phenolic compound and alkanolamine employed and by varying the molar ratios of the reactants. For example, if phenol, diethanolamine and formaldehyde are employed in a molar ratio of 1:3:3, the predominant product will have seven hydroxyl groups attached to a single molecule. If the molar ratio of these s me reactants is changed to 1:2:2, a pentol will be obtained a the predominant product. Similarly, when the molar ratio is 1:1:1, a triol is the predominant product.

If an excess of formaldehyde is used in the preparation of the triol or pentol, the Mannich reaction becomes complex due to the secondary condensation of phenol and formaldehyde. This is the well-known Novolak reaction which leads to polymethylene derivatives of phenol. For example, when phenol, diethanolamine and formaldehyde are reacted in the molar ratio of 1:1:2, the normal Mannich reaction occurs in one of the three active phenol positions. This leaves two available active positions on the phenol nucleus to undergo condensation with the excess formaldehyde. The presence of the amine groups affords sufficient base catalysis to promote the phenol-formaldehyde condensation leading to a complex reaction product.

In accordance with the present invention, the Mannich reaction product is reacted with an alkylene oxide to provide the final polyol. The nitrogen present in the Mannich condensate has sufficient catalytic activity to promote the reaction of one mole of the alkylene oxide with each free amino hydrogen atom and phenolic and primary hydroxyl group and no additional catalyst is needed. The alkoxylation is conducted at a temperature of about 30° C. to about 180° C. herein defined for the purpose of this application as an "alkylene oxide adduct of the Mannich reaction product of a phenolic compound with formaldehyde and an alkanolamine."

It is, of course, possible to add less than one mole of alkylene oxide per free phenolic and primary hydroxyl group in the Mannich condensation product. The minimum desirable amount of alkylene oxide is one mole per free amino hydrogen atom and phenolic hydroxyl group. In general, phenolic hydroxyl groups form unstable urethane linkages and so are to be avoided where practical. Generally, more than the minimum amount of alkylene oxide is used to obtain a product having a lower hydroxyl number and lower viscosity.

For example, a desirable product is that obtained by the addition of five mols of propylene oxide (rather than the maximum of seven or minimum of one) to the heptol obtained by the Mannich condensation of phenol, formaldehyde and diethanolamine in a molar ratio of 1:3:3.

Alkylene oxides are as previously defined including heteric or blocked mixtures thereof.

This invention is better demonstrated by way of example.

EXAMPLE I

An aqueous Mannich condensate (24.5 lbs.) prepared by the reaction of one mole of phenol, one mole of formaldehyde, and one mole of diethanolamine was charged to a jacketed pressure reactor equipped with a heat exchanger, temperature sensors, pressure gauges, vacuum stripping equipment, stirrer, oxide feed systems, nitrogen blanketing system, and raw material charge ports.

After the Mannich condensate was stripped to approximately 0.5 percent water, 13.31 lbs. of propylene oxide and 2.0 lbs. of ethylene was charged by block addition over a temperature range of 90° C. to 115° C. and then the mixture was digested for 1.5 hours at 115°–130° C.

The resulting polyol exhibited a hydroxyl number of 495 mg KOH/g and a viscosity of 5700 cps at 25° C. Basis the oxide recovered, the total oxide utilization was 94.9 percent. Example A-2

The above procedure was repeated except that after one hour of alkylene oxide digestion 0.36 lb of monoethanolamine was added and then the digestion was hydroxyl number of 524 mg KOH/g and a viscosity of 5920 cps at 25° C. Basis the oxide recovered, the oxide utilization was calculated to be 98.4%.

EXAMPLE II

Control B-1

A Mannich condensate was prepared by the combination of one mole of nonylphenol, 1.5 moles of formaldehyde, and 2 moles of diethanolamine. The condensate was alkoxylated as in example A-1 except 82 percent propylene oxide and 18 percent ethylene oxide was added as blocks over a temperature range of 96° C. to 120° C. After completing the addition, the mixture was digested for 2 hours at which time the reactor pressure was essentially constant. The oxide and low boiling material were removed by evacuating to 20 mm at 120° C. The product polyol had a hydroxyl number of 481 mg KOH/g and a viscosity of 8,850 cps at 25° C. The light material and oxide was equivalent to 3 percent of the oxide charge.

Example B-2

The procedure given in B-1 was repeated except that 1.31 lb. of diethanolamine and 14 g of water was added per an initial alkylene oxide charge of 35.3 lbs. The diethanolamine was added after 1.5 hours of digestion of alkylene oxide, and the digestion was continued for 0.5 hours after the diethanolamine addition. The light materials removed by stripping was equivalent to 0.8 percent of the oxide charge. The resulting polyol had a hydroxyl number of 487 mg KOH/g and viscosity 9,400 cps at 25° C.

EXAMPLE III

Control C-1

A Mannich condensate as described in B-1 was propoxylated to yield a polyol with a hydroxyl number of 473 mg KOH/g and a viscosity of 15,600 cps at 25° C. The oxide and light material stripped was equal to 12.2 percent of the oxide charge.

Example C-2

The procedure given in C-1 was repeated except after the digestion period was 75% complete, 3 lbs. of diethanolamine and 25 grams of water was charged per each 35 lbs. of propylene oxide initially charged. The resulting polyol had hydroxyl number of 518 mg KOH/g and a viscosity 12,500 cps at 25° C. The oxide and light materials recovered was equivalent to 4.3 percent of the original propylene oxide charged.

The principle of the invention and the best mode contemplated for applying the principle have been described. It is to be understood that the foregoing is illustrative only and that other means and techniques can be employed without departing from the true scope of the invention defined in the following claims.

What is claimed is:

1. In a process for preparing a modified amino polyol which comprises:
   (a) mixing an amino polyol initiator with an alkylene oxide selected from the group consisting of ethylene oxide, propylene oxide, 1,2-butylene oxide, styrene oxide, glycidol and mixtures thereof;
   (b) reacting and digesting the initiator with the alkylene oxide at a temperature of 30° C. to 180° C. to form a crude polyol mixture comprising an alkoxylated amino polyol with hydroxyl number of 300 to 900 and residual alkylene oxide;
   wherein the improvement comprises:
   (c) reacting the residual alkylene oxide with a second amine in situ at a temperature of 30° C. to 180° C. to form an alkanol amine.

2. The process of claim 1 wherein the initiator has an active hydrogen functionality equal to or greater than three.

3. The process of claim 1 wherein the initiator has an active hydrogen functionality of four to eight.

4. The process of claim 1 wherein the initiator is a sucrose polyol mixed with a first amine.

5. The process of claim 1 wherein the initiator is a sucrose polyol selected from the group consisting of sucrose, sorbitol, methyl glucoside and starch glucosides mixed with a first amine.

6. The process of claim 4 wherein the first amine is an alkanol amine.

7. The process of claim 4 wherein the first amine is an alkanol amine selected from the group consisting of monoethanol amine, diethanol amine, triethanol amine, hydroxyethyl-aminoethyl ether, isopropanolamine, diisopropanol amine and triisopropanol amine.

8. The process of claim 4 wherein the first amine is selected from the group consisting of ammonia, methylamine, ethylenediamine, isopropanolamine, diisopropanolamine, triisopropanolamine, 1,3-propanediamine, diethylenetriamine, triethylenetetramine, hexaethyleneheptamine, imino-bis-propylamine, ethanolamine, diethanolamine, triethanolamine, aminoethylethanolamine, benzylamine, piperazine, toluene diamine and aniline.

9. The process of claim 1 wherein the second amine is selected from the group consisting of ammonia, a primary amine and a secondary amine.

10. The process of claim 1 wherein the second amine is selected from the group consisting of ammonia, monoethanol amine and diethanol amine.

11. The process of claim 1 wherein the second amine is selected from the group consisting of ammonia, methylamine, ethylenediamine, 1,3-propanediamine, diethylenetriamine, triethylenetetramine, hexaethyleneheptamine, imino-bis-propylamine, ethanolamine, diethanolamine, triethanolamine, isopropanolamine, diisopropanolamine, triisopropanolamine, aminoethylethanolamine, benzylamine, piperazine, toluene diamine and aniline.

12. The process of claim 1 wherein the initiator is an aromatic amino polyol.

13. The process of claim 1 wherein the initiator is an aromatic amino polyol selected from the group consisting of Mannich condensates of phenolic compounds, aniline-formaldehyde condensates, phenol-formaldehyde condensates and mixed condensates of phenol, aniline and formaldehyde.

14. The process of claim 1 wherein the alkylene oxide is propylene oxide.

15. The process of claim 1 wherein the alkylene oxide is a mixture of propylene oxide and ethylene oxide.

16. The process of claim 1 wherein the initiator is the reaction product of sucrose and triethanol amine.

17. In a process for preparing a modified amino polyol for use in preparing rigid polyurethane foams which comprises:
   (a) mixing a phenol, a first alkanol amine, and formaldehyde
   (b) heating the resulting mixture at a temperature of from 50° C. to 150° C. for a period of time sufficient to reduce the formaldehyde content to no more than about 1%;
   (c) stripping water from the reaction product;
   (d) adding at a temperature of 30° C. to 180° C. an alkylene oxide selected from the group consisting of ethylene oxide, propylene oxide, 1,2-butylene oxide, styrene oxide, glycidol and mixtures thereof to the stripped reaction product at a temperature of 30° C. to 180° C. to form a crude polyol mixture comprising alkoxylated amino polyol with a hydroxyl number of 300 to 900 and residual alkylene oxide;
   wherein the improvement comprises:
   (e) reacting the residual alkylene oxide in situ with a second amine at a temperature of 30° C. to 180° C. to form a second alkanol amine.

* * * * *